US012701401B2

(12) United States Patent
Somasekhar

(10) Patent No.: US 12,701,401 B2
(45) Date of Patent: Aug. 4, 2026

(54) DISCOVER AND COMPLETE A PENDING EMBEDDED SUBSCRIBER IDENTITY MODULE SUBSCRIPTION

(71) Applicant: SAMSUNG ELECTRONICS CO., LTD., Gyeonggi-Do (KR)

(72) Inventor: Rajeshkumar Somasekhar, Neshanic Station, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 628 days.

(21) Appl. No.: 18/152,988

(22) Filed: Jan. 11, 2023

(65) Prior Publication Data

US 2024/0022896 A1 Jan. 18, 2024

Related U.S. Application Data

(60) Provisional application No. 63/388,767, filed on Jul. 13, 2022.

(51) Int. Cl.
*H04W 8/20* (2009.01)

(52) U.S. Cl.
CPC .................................. *H04W 8/205* (2013.01)

(58) Field of Classification Search
CPC .......... H04W 8/205; H04W 8/20; H04W 8/18
See application file for complete search history.

(56) References Cited

U.S. PATENT DOCUMENTS 10,477,384 B2 11/2019 Namiranian
10,708,766 B1 7/2020 Umamaheswaran et al.
11,012,852 B2 5/2021 Chaugule et al.
11,039,300 B2 6/2021 Anslot et al.
2018/0069581 A1* 3/2018 Narasimhan ........ H04L 12/1407
2020/0404501 A1* 12/2020 Kang .................... H04W 8/183
2021/0400494 A1 12/2021 Li et al.
2022/0038887 A1 2/2022 Chaugule et al.

FOREIGN PATENT DOCUMENTS

EP 4580227 A1 * 7/2025 ............ H04W 12/06

OTHER PUBLICATIONS

"Subscription Activation via ODSA Portal—Initial Steps," GSM Association, Service Entitlement Configuration, Official Document TS.43 Api Specification, V. 8.0, Jan. 28, 2022, Section 7.1, pp. 80-81.

* cited by examiner

*Primary Examiner* — Alison Slater

(57) ABSTRACT

Discovering and completing an eSIM subscription can include conveying, with an eSIM-capable device, an inquiry to a wireless service provider (WSP) system inquiring whether an eSIM subscription is pending for the eSIM-capable device. The inquiry can be conveyed automatically in response to powering up the eSIM-capable device. A communication can be received with the eSIM-capable device, the communication from the WSP system indicating whether the eSIM subscription is pending. Responsive to determining by the eSIM-capable device that the eSIM subscription is pending, the eSIM-capable device can initiate an eSIM subscription activation data flow from a WSP system server.

20 Claims, 7 Drawing Sheets

200

| | VALUES | DESCRIPTION |
|---|---|---|
| ServiceStatus | 1-Activated | eSIM device's service is activated. |
| | 2-Activating | eSIM device's service is being activated. |
| | 3-Deactivated | eSIM device's service is not activated. |
| | 4-Deactivated, No Reuse | eSIM device's service is not activated and the associated ICCID should not be reused. |
| | 5-Linked | eSIM profile is linked to EID |

400

| | VALUES | DESCRIPTION |
|---|---|---|
| Operation_type | 0-Subscribe | To activate a subscription for the eSIM device. |
| | 1-Unsubscribe | To cancel a subscription for the eSIM device. |
| | 2-Change Subscription | To manage an existing subscription on the eSIM device. |
| | 3-Transfer Subscription | To transfer a subscription from an existing device to the eSIM device |
| | 4-Update Subscription | To inform the network of a subscription update on the eSIM device. |
| | 5-Release | To release pending eSIM subscription |

Create a pending eSIM subscription for an eSIM-capable device
702

Convey the pending eSIM subscription message to the eSIM-capable device, the conveying in response to receiving a communication from the eSIM-capable device indicating an initial powering up of the eSIM-capable device
704

Generate eSIM activation data based on the pending eSIM subscription for the eSIM-capable device
706

Convey the eSIM activation data to the eSIM-capable device, making the activation data available for downloading to thereby enable the eSIM-capable device to activate the pending eSIM subscription
708

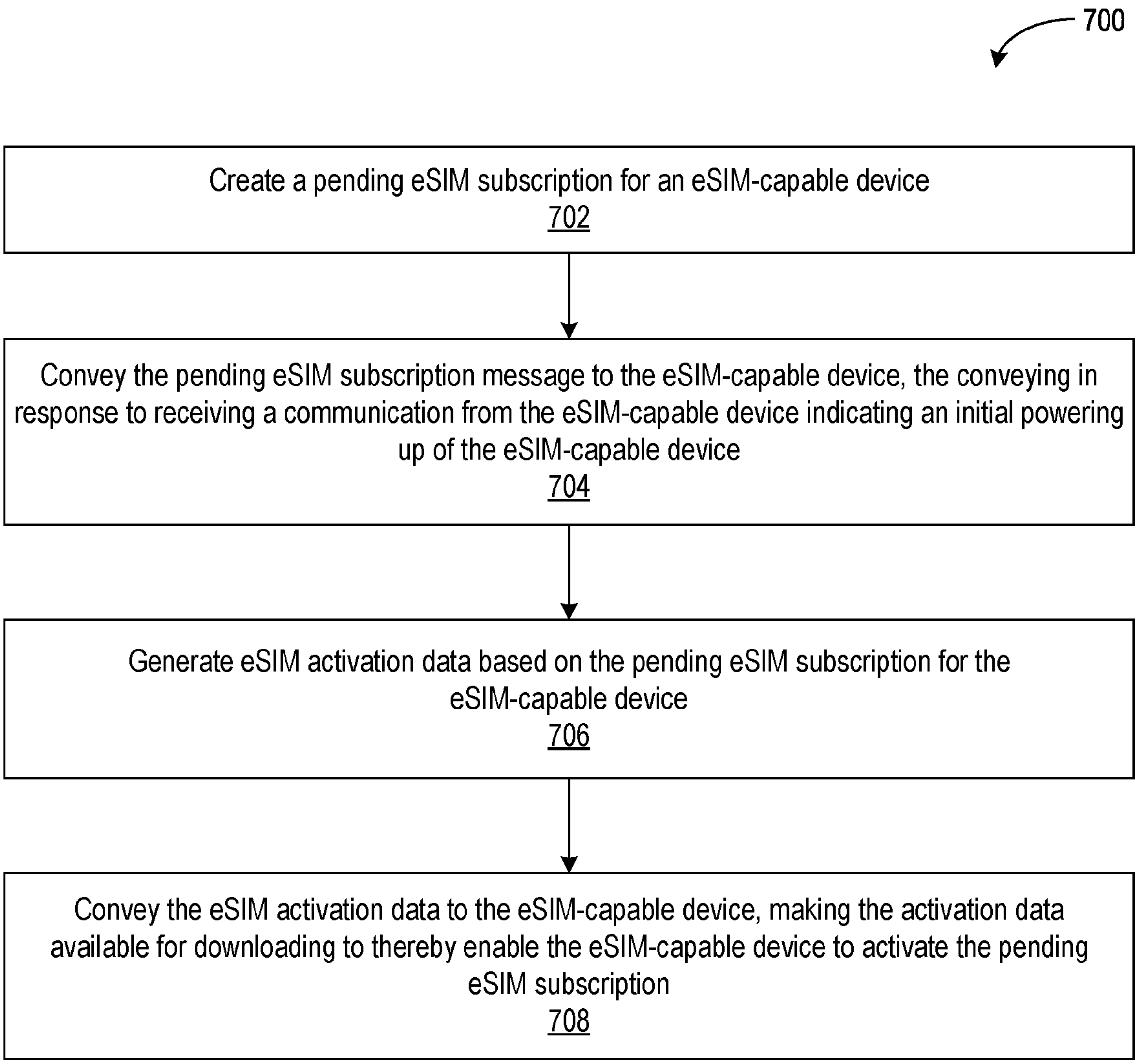

FIG. 7

DISCOVER AND COMPLETE A PENDING EMBEDDED SUBSCRIBER IDENTITY MODULE SUBSCRIPTION

CROSS-REFERENCE TO RELATED APPLICATIONS

This application claims the benefit of U.S. Provisional Patent Application No. 63/388,767 filed on Jul. 13, 2022, which is incorporated herein by reference in its entirety.

TECHNICAL FIELD

This disclosure relates to wireless communications, and more particularly, to discovering and activating an embedded subscriber identity module (eSIM) subscription pending for an eSIM-capable device.

BACKGROUND

An eSIM comprises software installed on an embedded universal integrated circuit card (eUICC). In contrast to a conventional SIM card, which detachably inserts in a device, the eUICC is permanently installed in an eSIM-capable device. To activate an eSIM subscription with a wireless service provider, the user of the eSIM-capable device downloads an eSIM profile created for the device. The eSIM profile is downloaded from a subscription manager data preparation (SMDP) server over a data communications network. A user who first turns on a newly acquired eSIM-capable device, however, does not have information that informs the user whether there is a pending eSIM subscription that can be activated for the device. It is necessary for the user to initiate a data flow over the Internet or other data network by manually selecting one or more user interface options to check whether a subscription is pending that can be activated.

SUMMARY

In an example implementation, a method for discovering and completing a pending eSIM subscription may include conveying, with an eSIM-capable device, an inquiry to a wireless service provider (WSP) system inquiring whether an eSIM subscription is pending for the eSIM-capable device. Conveying the inquiry may be automatically initiated in response to powering up the eSIM-capable device. The method may include receiving, with the eSIM-capable device, a communication from the WSP system indicating whether the eSIM subscription is pending. The method may include automatically initiating, with the eSIM-capable device, an eSIM subscription activation data flow from a WSP system server in response to determining by the eSIM-capable device that the eSIM subscription is pending.

In another example implementation, a device includes an embedded universal integrated circuit card (eUICC) that is configured to initiate certain operations. The operations may include conveying an inquiry to a WSP system inquiring whether an eSIM subscription is pending for the device. Conveying the inquiry may be automatically initiated in response to powering up the device. The operations may include receiving a communication from the WSP system indicating whether the eSIM-capable subscription is pending. The operations may include automatically initiating an eSIM subscription activation data flow from a WSP system server in response to determining that the eSIM subscription is pending.

In another example implementation, a system includes one or more processors. The one or more processors are configured to initiate certain operations. The operations may include creating a pending eSIM subscription for an eSIM-capable device. The operations may include transmitting a pending eSIM subscription message to the eSIM-capable device in response to receiving a communication from the eSIM-capable device indicating an initial powering up of the eSIM-capable device. The operations may include generating eSIM activation data based on the pending eSIM subscription for the eSIM-capable device. The operations may include conveying the eSIM activation data to the eSIM-capable device for downloading. Downloading and processing eSIM activation data enables the eSIM-capable device to activate the pending eSIM subscription.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates an example API for completing a pending eSIM subscription.

FIG. 7 illustrates an example method of facilitating discovery and completion of an eSIM subscription.

DETAILED DESCRIPTION

Figure 1:
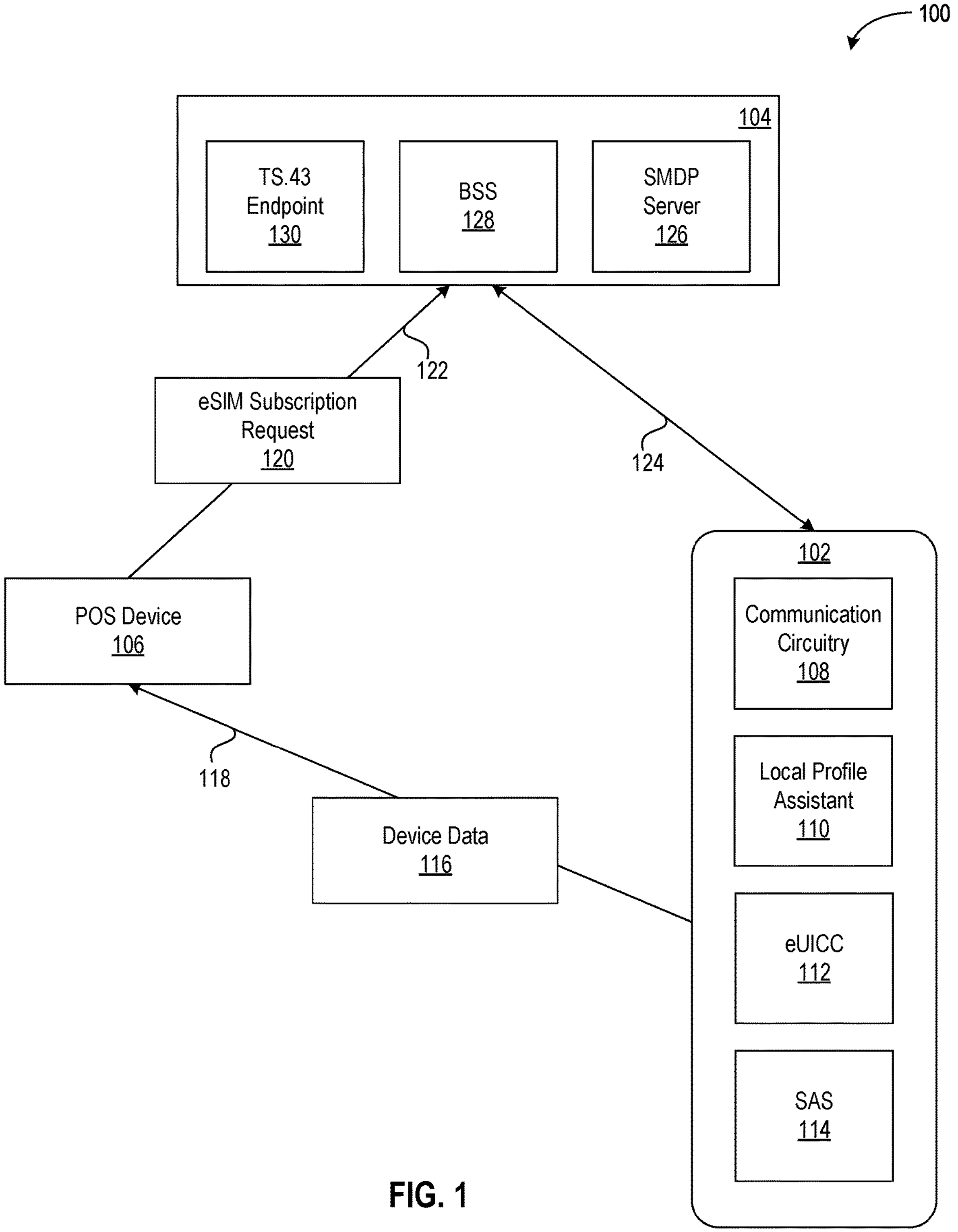
FIG. 1 illustrates an example communication environment for discovering and completing a pending eSIM subscription for an eSIM-capable device.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to wireless communications, and more particularly, to discovering and activating an embedded subscriber identity module (sSIM) subscription pending for an eSIM-capable device. An indefinite pendency of an eSIM subscription allows a user to delay activation until a time that the user chooses to activate the subscription. One drawback, however, is that a user who has purchased a new device does not have any information that indicates whether an eSIM subscription for the device is pending. To ascertain whether an eSIM subscription is pending, the user must select a user-interface option and, if there is a subscription pending, then the user must initiate activation of the eSIM subscription to make the device fully eSIM-capable.

In accordance with the inventive arrangements described within this disclosure, example methods, systems, and devices are provided that are capable of discovering and completing a pending eSIM subscription for an eSIM-capable device. An eSIM-capable device, for example, is a device in which an eUICC is fixedly integrated in the device to enable the device to connect to a wireless service provider's mobile network once an eSIM subscription is activated. A pending eSIM subscription, for example, is an eSIM subscription that has been created by a wireless service provider for a specific device, but which has not yet been activated. A pending eSIM subscription can correspond to provider-created eSIM profile that has not yet been released to the device for which the eSIM profile is created and to which the eSIM profile corresponds. In one or more example implementations, a pending eSIM subscription is created by a wireless service provider when a user purchases an eSIM-capable device. At the point-of-sale (POS), a salesperson can scan the newly purchased device to collect device information and transmit the device information to the wireless service provider's SMDP server as part of a subscription request. In some example implementations, the eSIM subscription is created prior to the user's purchasing the eSIM-capable device.

The SMDP server, in response to the request, creates a pending eSIM subscription. In certain arrangements, the pending eSIM subscription is transmitted to the POS, where it is downloaded to the newly purchased device. Subsequently, at a time of the user's choosing, a subscription activation data flow is setup in response to the user's powering up the device, in which data is stored pertaining to the pending eSIM subscription. While the eSIM subscription is pending with respect to the newly acquired device, the eSIM subscription if previously activated with respect to another device of the user remains active for that other device. The eSIM subscription remains active for the other device until the user powers on the newly acquired device for which the eSIM subscription is yet pending. Once the newly acquired device is powered on, the device automatically initiates the subscription activation data flow and completes the eSIM subscription using the data stored on the device.

On the powering up of an eSIM-capable device for which an eSIM subscription is pending, the activation data flow is invoked by the device using an acquire configuration API. In certain embodiments, the acquire configuration API is a modification or reconfiguration of the GSMA-defined TS.43 AcquireConfiguration API. The acquire configuration API introduced by the inventive arrangements herein is used to query the SMDP server whether an eSIM subscription is assigned to a device and is pending. If an already assigned eSIM subscription is pending, then the acquire configuration API invokes a response indicating whether an eSIM subscription is pending. Based on the acquire configuration API response indicating an eSIM subscription is pending, the device initiates a subscription activation data flow using a manage subscription API. In certain embodiments, the manage subscription API is a modification or reconfiguration of the GSMA-defined TS 0.43 ManageSubscription API.

In one aspect, the inventive arrangements reconfigure or modify the GSMA-defined AcquireConfiguration API defined according to the GSMA TS.43 API specification, because as currently defined the GSMA-defined AcquireConfiguration API does not accommodate state for pending eSIM subscription. The acquire configuration API disclosed herein is used in linking an eSIM profile to the eUICC of the eSIM-capable device. The linking enables the pendency of an eSIM subscription for the eSIM-capable device, awaiting a response to the powering up of the eSIM-capable device. The pendency is indicated by a service status for the eSIM-capable device, namely serviceStatus=LINKED, which indicates that an eSIM subscription is pending.

In another aspect, the inventive arrangements reconfigure or modify the GSMA-defined ManageSubscription API defined according to the GSMA TS.43 API specification to enable automatic activation of a pending eSIM subscription. The manage subscription API introduced herein provides a novel operation type to complete the pending eSIM subscription. The operation type of the manage subscription API introduced herein is designated a RELEASE operation. The operation initiates completion of the eSIM subscription and activation of eSIM services provided by a wireless service provider, thereby enabling the eSIM-capable device to communicate over the wireless service provider's mobile network.

Thus, using the acquire configuration API as introduced by the inventive arrangements disclosed, a pending eSIM subscription is discovered merely by a user's powering up the eSIM-capable device for which the eSIM subscription is pending. Using the manage subscription API introduced by the inventive arrangements, the subscription activation data flow is initiated for completing the eSIM subscription.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Referring initially to FIG. 1, an example communication environment 100 is illustrated. Illustratively, example communication environment 100 includes eSIM-capable device 102, provisioning system 104, and POS device 106. eSIM-capable device 102, provisioning system 104, and POS device 106 are each configured to operate cooperatively with the other two to facilitate eSIM-capable device 102's discovering and completing an eSIM subscription. eSIM-capable device 102 illustratively includes communication circuitry 108, local profile assistant (LPA) 110, eUICC 112, and subscription activation subsystem (SAS) 114. In various embodiments, eSIM-capable device 102 can be implemented as a smartphone, smartwatch, computer, (e.g., PC), or other such device. eSIM-capable device 102, in various arrangements, can include all or some combination of components of example device 800 described with reference to FIG. 8, including one or more processors 802 and memory 804. LPA 110 and SAS 114, in certain embodiments, can be implemented in software that is stored in memory 804 and executes on processor(s) 802. (See FIG. 8.)

Provisioning system 104 illustratively includes SMDP server 126, Basic Services Set (BSS) 128, and TS.43 Endpoint 130. Provisioning system 104 can be implemented in a combination of hardware and software by a wireless service provider. POS device 106 likewise can be implemented in a combination of hardware and software, including processor(s) 802, memory 804, and other components.

eSIM-capable device 102 is capable of communicating over a wireless service provider's mobile network by virtue of eUICC 112 but needs the eSIM subscription completed to induce the wireless service provider to provide service over the network. A pending eSIM subscription is illustratively created with POS device 106 when a user purchases eSIM-capable device 102. POS device 106 is configured to read-in pertinent device data 116, including the EID, corresponding to eSIM-capable device 102. POS device 106 can acquire device data 116 from eSIM-capable device 102 via a wired or wireless connection over communication link 118. In some arrangements, eSIM-capable device 102 can plug directly into POS device 106.

POS device 106 conveys device data 116, including the EID of eSIM-capable device 102, to provisioning system 104 as part of and in conjunction with eSIM subscription request 120. POS device 106 conveys eSIM subscription request 120 to provisioning system 104 via a wired or wireless connection over communication channel 122. In some arrangements, POS device 106 can be collocated with or near to provisioning system 104. In other arrangements, provisioning system 104 and POS device 106 can be located remotely from one another, in which case communication channel 122 can be created over a network, such as the Internet or other data communication network.

Figures 2, 3:
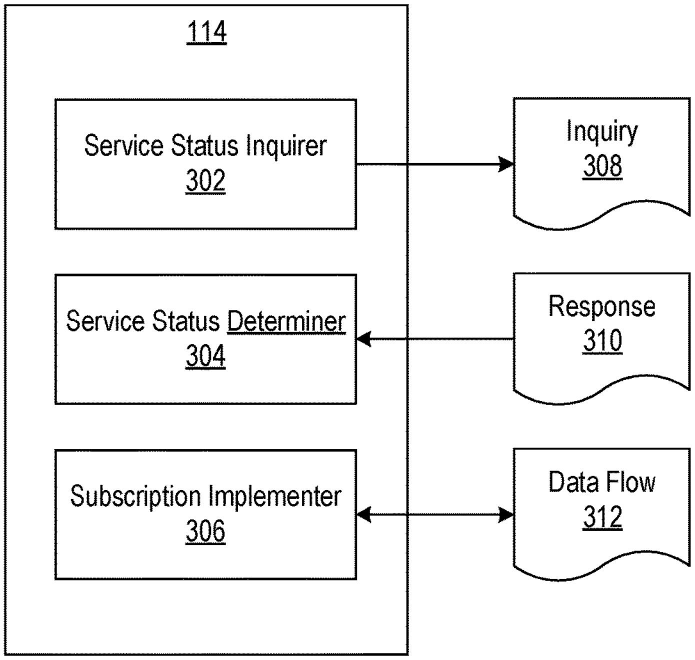
FIG. 2 illustrates an example Application Programming Interface (API) for discovering a pending eSIM subscription.
FIG. 3 illustrates an example architecture of a subscription activation subsystem for discovering and completing an eSIM subscription.

Provisioning system 104 responds to receipt of eSIM subscription request 120 by creating a pending eSIM subscription corresponding to eSIM-capable device 102. In creating the pending eSIM subscription, provisioning system 104 generates an eSIM profile corresponding to eSIM-capable device 102 and links the eSIM profile to the EID of eSIM-capable device 102. In certain embodiments, provisioning system 104's creation of the pending eSIM subscription is supported by an acquire configuration API. The acquire configuration API links the EID of eSIM-capable device 102 with an eSIM profile. Referring additionally to FIG. 2, an example specification of the acquire configuration API is illustrated by AcquireConfiguration API 200. provisioning system 104 can later use AcquireConfiguration API 200 to inform eSIM-capable device 102, via communication channel 124, of a pending eSIM subscription in a latter communication after eSIM-capable device 102 leaves the POS with the user.

The latter communication, described below, over communication channel 124 is in response to an inquiry, also described below, from eSIM-capable device 102 to provisioning system 104, the inquiry automatically initiated in response to the user's subsequently powering up eSIM-capable device 102 sometime after leaving the POS. Prior to the eSIM-capable device 102 leaving the POS with the user, provisioning system 104 updates TS.43 Endpoint 130 with pending eSIM state for the device EID. When the latter inquiry is conveyed by eSIM-capable device 102 to provisioning system (using preconfigured network address of TS.43 Endpoint 130) 104 over communication channel 124, eSIM-capable device 102's eSIM subscription is yet pending, and therefore eSIM-capable device 102 uses the manage subscription API to release the subscription and establish communication channel 124 with SMDP server 126 using the network address returned by TS.43 Endpoint 130 or in some arrangement by BSS 128 over communication channel 124, to download the eSIM profile to complete the subscription activation flow.

The specification of AcquireConfiguration API 200, illustrated in FIG. 2, is a modification of the GSMA-defined TS.43 API specification of the same name. As illustrated in FIG. 2, AcquireConfiguration API 200 is used for the different states of service, ServiceStatus (first column), of a pending eSIM subscription. Each status is indicated by a value from 1 through 5 (second column). In addition to the four states—activated, being activated, not activated, and not activated ICCID should not be used—AcquireConfiguration API 200 includes a fifth state that supports the pending eSIM subscription. ServiceStatus 5 is LINKED. Each ServiceStatus is described (third column). The LINKED state, as described, indicates a pending eSIM subscription by specifying an eSIM profile linked to an EID. That is, a pending eSIM subscription has been created and is already linked to a specific device EID, the EID corresponding to the eUICC of eSIM-capable device 102.

Referring additionally to FIG. 3, an example architecture of SAS 114 is illustrated. Illustratively, SAS 114 includes service status inquirer 302, service status determiner 304, and subscription implementer 306. Service status inquirer 302, service status determiner 304, and subscription implementer 306 can each be implemented in hardware (dedicated circuitry), software (processor-executable code), or a combination of hardware and software.

Operatively, when the user initially powers up eSIM-capable device 102, a check is performed by eSIM-capable device 102 for an active eSIM subscription. If there is no active SIM subscription, service status inquirer 302 automatically determines whether an eSIM subscription for eSIM-capable device 102 is pending. To determine whether an eSIM subscription is pending, service subscription inquirer 302 conveys inquiry 308. Inquiry 308 is conveyed to provisioning system 104. Using the acquire subscription API, inquiry 308 determines whether an eSIM subscription is pending if the service status of eSIM-capable device 102 is in the LINKED state. The LINKED state indicates a pending eSIM subscription for eSIM-capable device 102. Illustratively, eSIM-capable device 102 communicates with provisioning system 104 of the wireless service provider over communication channel 124 and conveys inquiry 308 directly to provisioning system 104. Because, as yet, eSIM-capable device 102 is not operable over a mobile network, communication channel 124 is created via the Internet or other data communications network enabling eSIM-capable device 102 to communicates with provisioning system 104.

In response to inquiry 308, eSIM-capable device 102 receives via communication channel 124 response 310 from the wireless service provider indicating whether an eSIM subscription is pending. Response 310 is illustratively received directly from provisioning system 104 over communication channel 124.

Service status determiner 304 determines whether an eSIM subscription is pending for eSIM-capable device 102 based on response 310. In certain embodiments, service status determiner 304 determines the pendency of an eSIM subscription based on AcquireConfiguration API 200 having a Service Status value of 5, indicating an eSIM subscription is linked to the EID of eSIM-capable device 102. (See FIG. 2.) If an eSIM subscription is linked to the EID of eSIM capable device 102—and thus the subscription is pending— subscription implementer 306 automatically initiates eSIM subscription activation data flow 312 between provisioning system (TS.43 Endpoint 130) and eSIM capable device 102. eSIM-capable device 102 downloads and processes eSIM subscription activation data flow 312 for completing the eSIM subscription. In certain embodiments, subscription implementer 306 automatically initiates eSIM subscription activation data flow 312 by invoking a manage subscription API. Referring additionally to FIG. 4, an example specification of the API is illustrated by ManageSubscription API 400.

The specification of ManageSubscription API 400, illustrated in FIG. 4, is a modification of the GSMA-defined TS.43 API specification of the same name. As illustrated in FIG. 4, ManageSubscription API 400 indicates an Operation Type (first column). The specific type of operation is indicated by a value between 0 and 5 (second column). Each type of operation is described (third column). The newly created operation is Operation Type 5, RELEASE. RELEASE is an operation to release a pending eSIM subscription. In response to the determination that an eSIM subscription is pending, subscription implementer 306 invokes the RELEASE operation. The operation initiates eSIM subscription activation data flow 312 from provisioning system 104 to eSIM-capable device 102. The eSIM subscription activation data flow conveys data that is executed on a processor of eSIM-capable device 102 for completing the eSIM subscription.

In some embodiments, upon completion of the eSIM subscription activation data flow from a web portal to eSIM-capable device 102, a response is conveyed from the web portal to LPA 110. The response, for example, can comprise a JavaScript callback per other GSMA-defined TS.43 API specifications. Based on the JavaScript callback, LPA 110 initiates a download procedure per a GSMA-defined SGP.22 specification, by setting up communication channel 124 with provisioning system 104 (e.g., SMDP server 126), the procedure for downloading the eSIM profile needed to complete the eSIM subscription.

Figure 5:
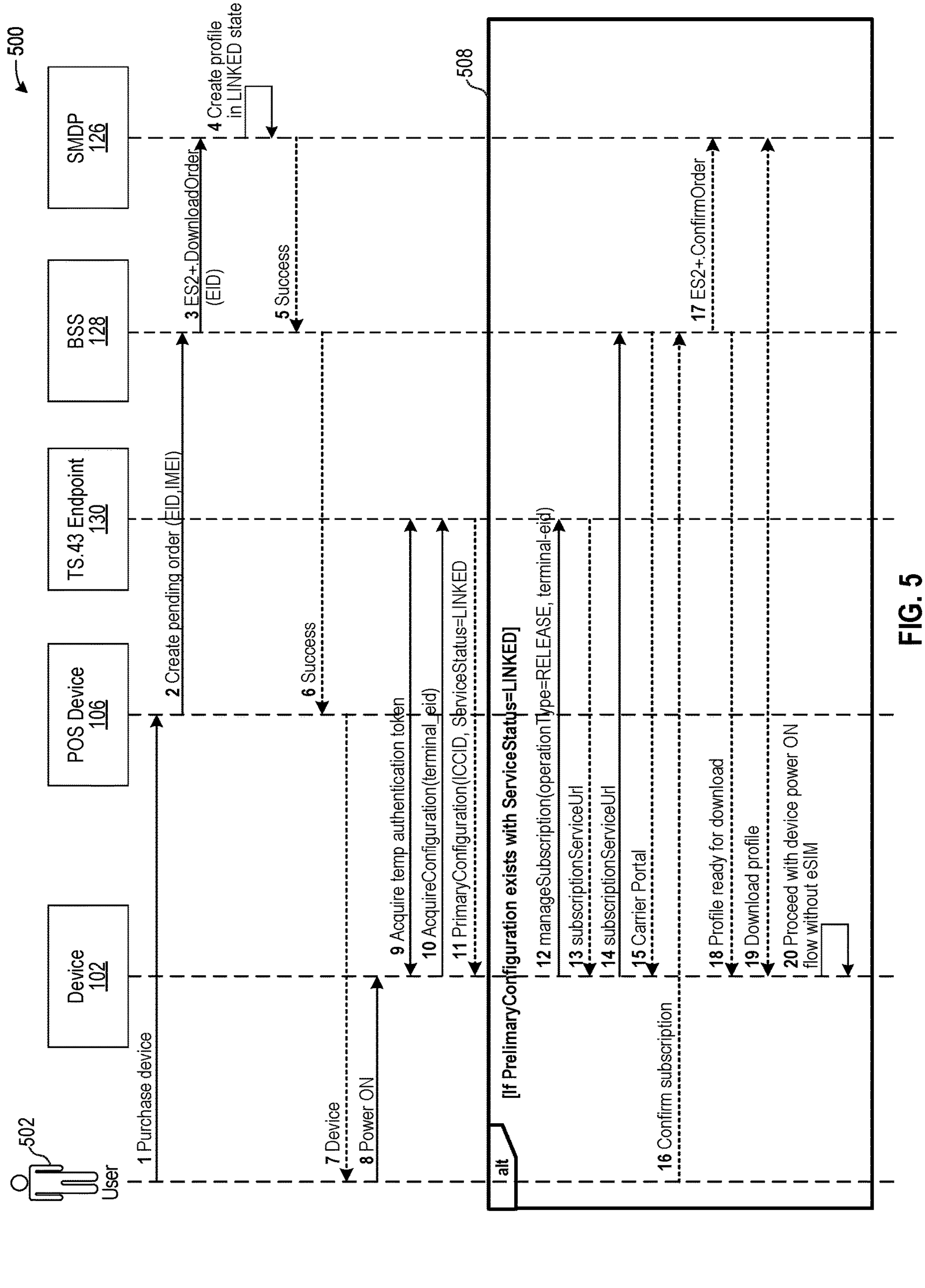
FIG. 5 illustrates an example series of message exchanges and device actions for creating, discovering, and completing a pending eSIM subscription.

FIG. 5 illustrates an example series of message exchanges and device actions 500 for creating, discovering, and completing a pending eSIM subscription. Illustratively, the messages are exchanged between eSIM-capable device 102, SMDP server 126, BSS 128, TS.43 Endpoint 130, and POS device 106. Initial action 1 is the purchase of eSIM-capable device 102 by user 502, the purchase prompting action 2 by POS device 106 of creating a pending order that includes the device EID. The pending order is conveyed by POS device 106 to BSS 128. Message 3, created with the BSS 128, is an ES2+.DownloadOrder for the EID, which is conveyed to SMDP server 126. Action 4 is the creation by SMDP server 126 of an eSIM profile and linking it to the EID. Using an acquire configuration API (e.g., AcquireConfiguration API 200), the service status of the eSIM is placed in the LINKED state, and SMDP server 126 conveys message 5 indicating successful creation of the pending eSIM subscription. Message 6 conveys the success indication to POS device 106, which forwards the indication to eSIM-capable device 102 as message 7.

Action 8—the powering on of eSIM-capable device 102—automatically initiates an of authentication token acquisition through mutual messages 9 exchanged between TS.43 Endpoint 130 and eSIM-capable device 102. Message 10 is an acquire subscription inquiry, which prompts response 11 from TS.43 Endpoint 130 indicating service status. Subseries of messages and actions 508 is initiated if the service status is LINKED. Message 12 conveyed from eSIM-capable device 102 to TS.43 Endpoint 130 initiates the specific operations for completing the pending eSIM subscription using a manage subscription API (e.g., ManageSubscription API 400). TS.43 Endpoint 130 responds with message 13. Message 14 for subscription service is conveyed from eSIM-capable device 102 to BSS 128, which conveys information for subscription completion to an eSIM-capable device 102 web portal. eSIM-capable device responds with message 16. Message 17 is an ES2+.ConfirmOrder conveyed from BSS 128 to SMDP server 126. Message 18 from BSS 128 informs eSIM-capable device 102 when the eSIM profile is ready for download. Message exchanges 19 between eSIM-capable device 102 and SMDP server 126 provide eSIM-capable device with the data for performing action 20, which completes the eSIM subscription for eSIM-capable device 102.

Figure 6:
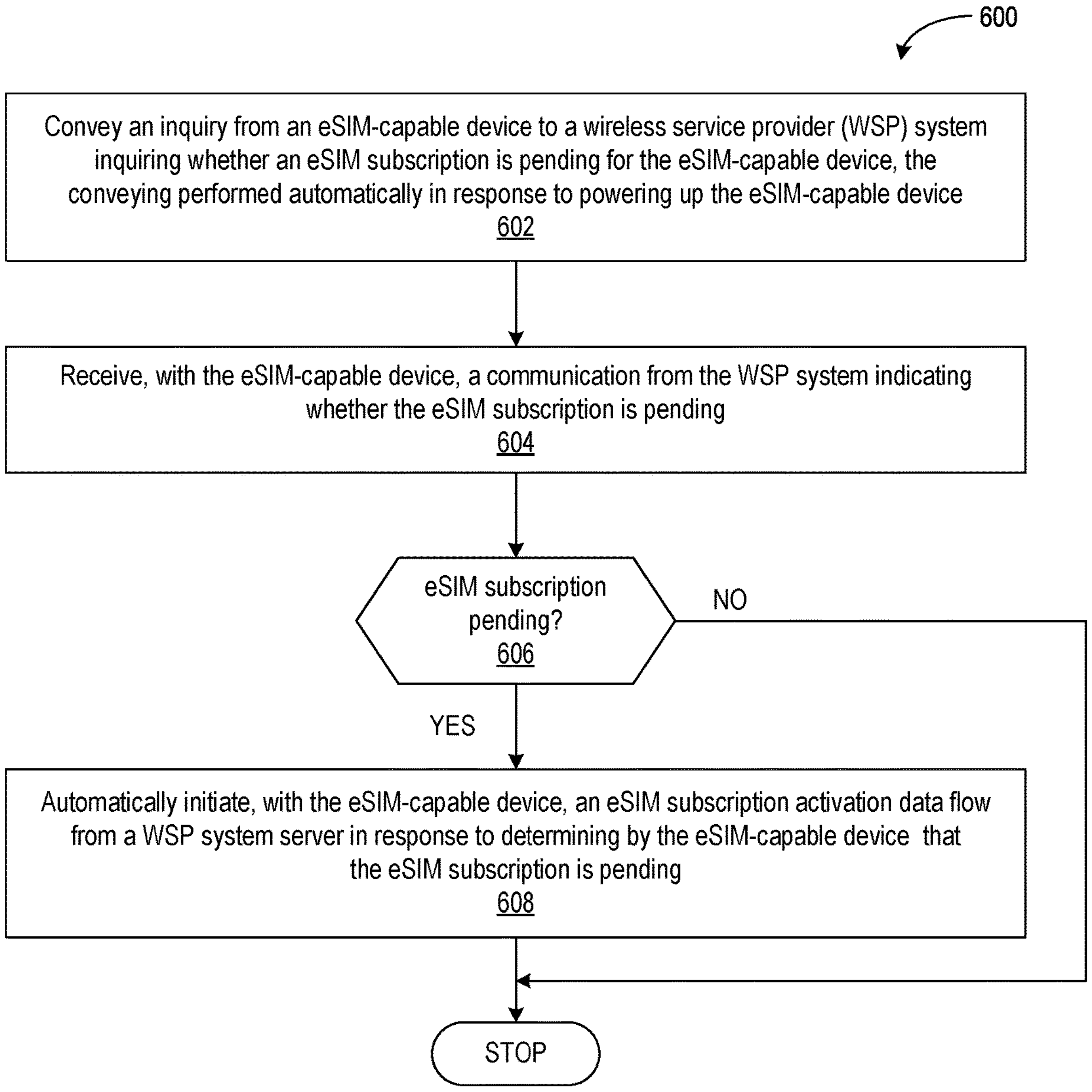
FIG. 6 illustrates an example method of facilitating the discovery and completion of a pending eSIM subscription.

FIG. 6 illustrates example method 600 of discovering and completing and eSIM subscription. Method 600 may be performed by an eSIM-capable device, such as eSIM-capable device 102, that includes a subscription activation subsystem, such as SAS 114.

At block 602, the eSIM-capable device conveys an inquiry to a wireless service provider inquiring whether an eSIM subscription is pending for the eSIM-capable device. The inquiry can be conveyed by the eSIM-capable device automatically and performed in response to powering up the eSIM-capable device. The inquiry can be conveyed by the eSIM-capable device to a provisioning system of the wireless service provider.

At block 604, the eSIM-capable device receives a communication from the wireless service provider. The communication can be a response to the inquiry conveyed to the provisioning system (TS.43 Endpoint, SMDP server). The communication indicates whether the eSIM subscription is pending.

At block 606, based on the received communication, the eSIM-capable device determines whether the eSIM subscription is pending.

At block 608, in response to determining that the eSIM subscription is pending, the eSIM-capable device initiates an eSIM subscription activation data flow from a wireless service provider server (e.g., SMD server). The eSIM subscription activation data flow is initiated automatically by the eSIM-capable device for completing the eSIM subscription with the data, which is received from the wireless service provider server over an Internet or other data communication network connection. The data received from wireless service provider server is executed by the eSIM-capable device in completing the eSIM subscription, thereby inducing the wireless service provider to begin providing wireless services to the eSIM-capable device over a mobile network.

The eSIM subscription in certain arrangements is configured to include an eSIM profile. The eSIM profile can be created by the wireless service provider using the SMDP server. The eSIM profile can be linked to an embedded Universal Integrated Circuit Card (eUICC) identifier (EID) corresponding to the eSIM-capable device. In certain arrangements, linking the eSIM profile to the EID corresponding to the eSIM-capable device can be performed using an RSP ES2+.Download Order API.

The communication is configured using an API. The API can be an acquire configuration API. If acquire configuration API is in the LINKED state, the API communicates that an eSIM subscription is pending for the eSIM-capable device. The acquire configuration API can be AcquireConfiguration API 200, which is a reconfiguration of the GSMA-defined TS.43 AcquireConfiguration API. (See FIG. 2.) The eSIM-capable device can automatically initiate the eSIM subscription activation data flow by invoking a manage subscription API. If the manage subscription API indicates a RELEASE operation type, the API "releases" or initiates the eSIM subscription activation data flow. The RELEASE causes the SMDP server to release the data for downloading from the wireless service provider server to enable the eSIM-capable device to complete the eSIM subscription. The manage subscription API can be ManageSubscription API 400, which is a reconfiguration of the GSMA-defined TS.43 ManageSubscription APA. The pending eSIM subscription is pending while assigned to an EID corresponding to the eSIM-capable device prior to activation by the eSIM-capable device.

FIG. 7 illustrates example method 700 of facilitating discovery and completion of an eSIM subscription. Method 700 can be performed by a server or other computing device, such as SMDP server 126, having hardware that includes one or more processors and software executing thereon for performing certain operations. With respect to method 700, the hardware and software are collectively referred to as "the system."

At block 702, the system creates a pending eSIM subscription for an eSIM-capable device, and at block 704, the system conveys the pending eSIM subscription message the eSIM-capable device. The system conveys the subscription message in response to receiving a communication from the eSIM-capable device indicating an initial powering up of the eSIM-capable device.

At block 706, the system generates eSIM activation data. The system generates the eSIM activation data based on the pending eSIM subscription for the eSIM-capable device.

At block 708, the system conveys the eSIM activation data to the eSIM-capable device. The eSIM activation data conveyed is available for automatically downloading by the eSIM-capable device. Execution of the activation data by the eSIM-capable device enables the eSIM-capable device to activate the pending eSIM subscription.

In certain embodiments, the system configures the eSIM subscription to include an eSIM profile. The eSIM profile can be included in the eSIM activation data. The system can create the eSIM profile using a Subscription Manager Data Preparation (SMDP) server.

In certain embodiments, the system links the eSIM profile to an EID corresponding to an embedded Universal Integrated Circuit Card (eUICC) of the eSIM-capable device. The system can perform the linking of the eSIM profile to the EID corresponding to the eSIM-capable device using a GSMA-defined RSP ES2+.Download Order API.

In various arrangements, the system can create the pending eSIM subscription based, in part, on user data retrieved when the eSIM-capable device is conveyed to a user at a point-of-sale (POS) of the WPS system. In other arrangements, the system can create the pending eSIM subscription any time prior to the conveying the eSIM-capable device to the user.

Figure 8:
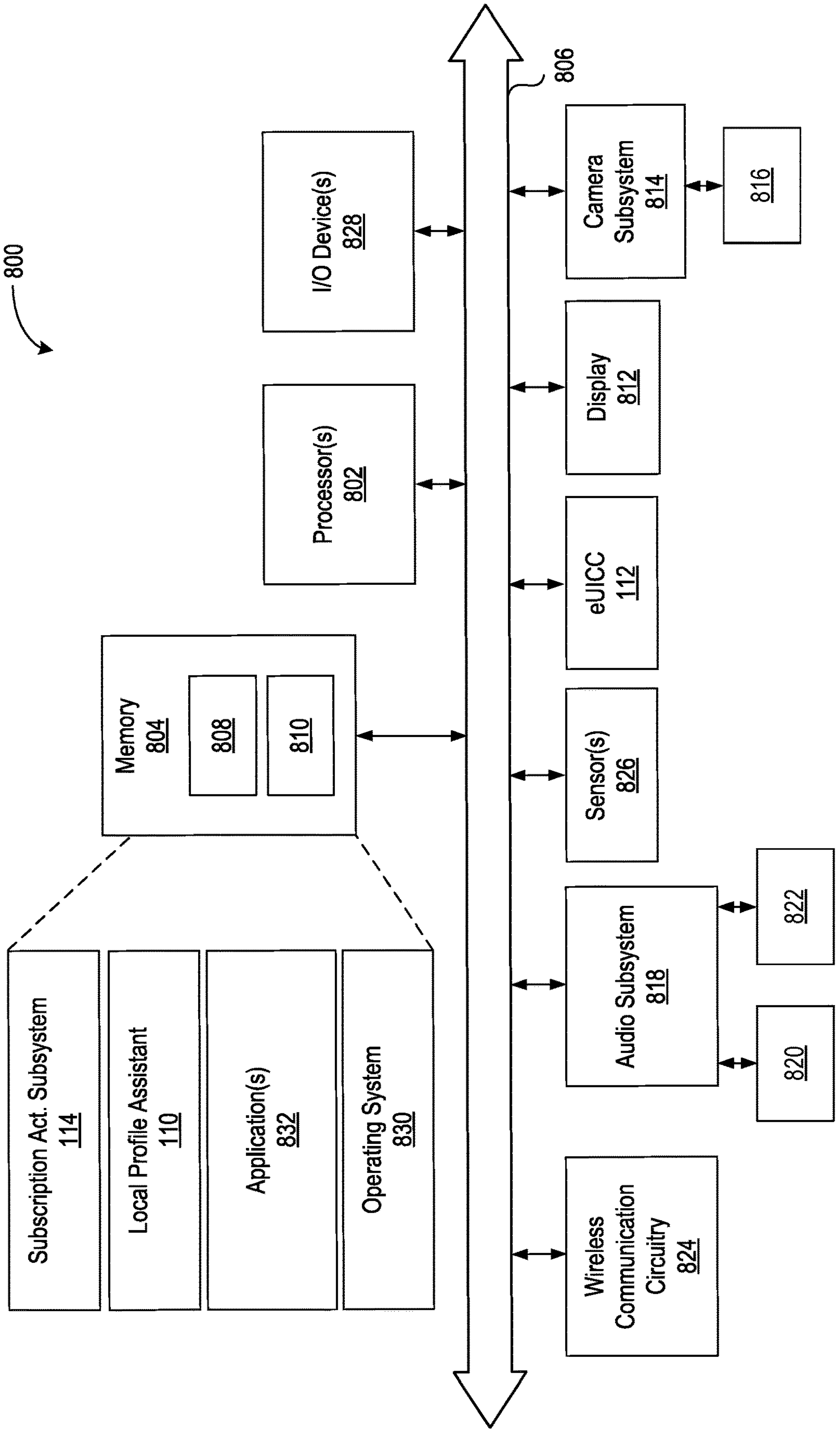
FIG. 8 illustrates an example device configured for operation as an eSIM-capable device.

FIG. 8 illustrates an example device 800 which can be configured for operation as an eSIM-capable device. Illustratively, in addition to LPA 110, eUICC 112, and SAS 114, device 800 includes one or more processors 802 coupled to memory 804 through interface circuitry 806. Device 800 stores computer readable instructions (also referred to as "program code") within memory 804, which is an example of computer readable storage media. Processor(s) 802 execute the program code accessed from memory 804 via interface circuitry 806.

Memory 804 can include one or more physical memory devices such as local memory 808 and bulk storage device 810, for example. Local memory 808 is implemented as one or more non-persistent memory device(s) generally used during actual execution of the program code. Local memory 808 is an example of a runtime memory. Examples of local memory 808 include any of the various types of RAM suitable for use by a processor for executing program code. Bulk storage device 810 is implemented as a persistent data storage device. Examples of bulk storage device 810 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 800 can also include one or more cache memories (not shown) that provide temporary storage of at least some program code in order to reduce the number of times program code must be retrieved from a bulk storage device during execution.

Examples of interface circuitry 806 include, but are not limited to, an input/output (I/O) subsystem, an I/O interface, a bus system, and a memory interface. For example, interface circuitry 806 can be implemented as any of a variety of bus structures and/or combinations of bus structures including a memory bus or memory controller, a peripheral bus, an accelerated graphics port, and a processor or local bus.

In one or more example implementations, processor(s) 802, memory 804, and/or interface circuitry 806 are implemented as separate components. Processor(s) 802, memory 804, and/or interface circuitry 806 may be integrated in one or more integrated circuits. The various components in device 800, for example, can be coupled by one or more communication buses or signal lines (e.g., interconnects and/or wires). Memory 804 may be coupled to interface circuitry 806 via a memory interface, such as a memory controller or other memory interface (not shown).

Device 800 can include one or more displays. Illustratively, for example, device 800 includes display 812 (e.g., a screen). If device 800 is configured as an HMD, for example, display 812 can be a monocular HMD comprising a single optic or a binocular HMD comprising an optic in front of each eye. As an HMD, display 812 can comprise lenses and semi-transparent mirrors embedded in eyeglasses (also termed data glasses), a visor, or a helmet. Display 812 can be implemented as a touch-sensitive or touchscreen display capable of receiving touch input from a user. A touch sensitive display and/or a touch-sensitive pad is capable of detecting contact, movement, gestures, and breaks in contact using any of a variety of avail, able touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 800 can include camera subsystem 814. Camera subsystem 814 can be coupled to interface circuitry 806 directly or through a suitable input/output (I/O) controller. Camera subsystem 814 can be coupled to optical sensor 816. Optical sensor 816 can be implemented using any of a variety of technologies. Examples of optical sensor 816 can include, but are not limited to, a charged coupled device (CCD) or a complementary metal-oxide semiconductor (CMOS) optical sensor. Optical sensor 816, for example, can be a depth sensor. Camera subsystem 814 and optical sensor 816 are capable of performing camera functions such as recording or capturing images and/or recording video.

Device 800 can include an audio subsystem 818. Audio subsystem 818 can be coupled to interface circuitry 806 directly or through a suitable input/output (I/O) controller. Audio subsystem 818 can be coupled to a speaker 820 and a microphone 822 to facilitate voice-enabled functions, such as voice recognition, voice replication, digital recording, and telephony functions.

Device 800 can include one or more wireless communication subsystems 824, which can be implemented as components of communication circuitry such as communication circuitry 108 (See FIG. 1). Each of wireless communication subsystem(s) 824 can be coupled to interface circuitry 806 directly or through a suitable I/O controller (not shown). Each of wireless communication subsystem(s) 824 is capable of facilitating communication functions. Examples of wireless communication subsystems 824 can include, but are not limited to, radio frequency receivers and transmitters, and optical (e.g., infrared) receivers and transmitters. The specific design and implementation of wireless communication subsystem 824 can depend on the particular type of device 800 implemented and/or the communication network(s) over which device 800 is intended to operate.

As an illustrative and non-limiting example, wireless communication subsystem(s) 824 may be designed to operate over one or more mobile networks, Wi-Fi networks, short range wireless networks (e.g., a Bluetooth), and/or any combination of the foregoing. Wireless communication subsystem(s) 824 can implement hosting protocols such that device 800 can be configured as a base station for other wireless devices.

Device 800 may include one or more sensors 826, each of which can be coupled to interface circuitry 806 directly or through a suitable I/O controller (not shown). Examples of sensor(s) 826 that can be included in device 800 include, but are not limited to, a motion sensor, a light sensor, and a proximity sensor to facilitate orientation, lighting, and proximity functions, respectively, of device 800. Other examples of sensors 826 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 800 in 3D, and an altimeter (e.g., an integrated circuit) capable of providing data indicating altitude.

Device 800 further may include one or more input/output (I/O) devices 828 coupled to interface circuitry 806. I/O can be part of communication circuitry, such as communication circuitry 108 (See FIG. 1). I/O device(s) 828 can be coupled to interface circuitry 806 either directly or through intervening I/O controllers (not shown). Examples of I/O devices 828 include, but are not limited to, a track pad, a keyboard, a display device, a pointing device, one or more communication ports (e.g., Universal Serial Bus (USB) ports) or other wired connections, a network adapter, and buttons or other physical controls. A network adapter refers to circuitry that enables device 800 to become coupled to other systems, computer systems, remote printers, and/or remote storage devices through intervening private or public networks. Modems, cable modems, Ethernet interfaces, and wireless transceivers not part of wireless communication subsystem(s) 824 are examples of different types of network adapters that may be used with device 800. One or more of I/O devices 828 may be adapted to control functions of one or more or all of sensors 826 and/or one or more of wireless communication subsystem(s) 824.

Memory 804 stores program code. Examples of program code include, but are not limited to, routines, programs, objects, components, logic, and other data structures. For purposes of illustration, memory 804 stores an operating system 830 and application(s) 832 eUICC 110, operatively couples with other components through interface circuitry 806. LPA 110 and SAS 114, implemented in software, are stored in memory 804 and can execute on processor(s) 802.

Device 800 is provided for purposes of illustration and not limitation. A device and/or system configured to perform the operations described herein can have a different architecture than illustrated in FIG. 8. The architecture can be a simplified version of the architecture described in connection with FIG. 8 that includes a memory capable of storing instructions and a processor capable of executing instructions. In this regard, device 800 may include fewer components than shown or additional components not illustrated in FIG. 8 depending upon the particular type of device that is implemented. In addition, the particular operating system and/or application(s) included can vary according to device type as can the types of I/O devices included. Further, one or more of the illustrative components can be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:

conveying, with an embedded subscriber identity module (eSIM)-capable device, an inquiry to a wireless service provider (WSP) system inquiring whether an eSIM subscription is pending for the eSIM-capable device, wherein the conveying is automatically initiated without human intervention in response to powering up the eSIM-capable device;

receiving, with the eSIM-capable device, a communication from the WSP system indicating whether the eSIM subscription is pending; and automatically initiating without human intervention, with the eSIM-capable device, an eSIM subscription activation data flow from the WSP system in response to determining by the eSIM-capable device that the eSIM subscription is pending.

2. The method of claim 1, wherein the eSIM subscription is configured to include an eSIM profile.

3. The method of claim 2, wherein the eSIM profile is created by the WSP system using a Subscription Manager Data Preparation (SMDP) server.

4. The method of claim 2, wherein the eSIM profile is linked to an embedded Universal Integrated Circuit Card (eUICC) identifier (EID) corresponding to the eSIM-capable device.

5. The method of claim 2, further comprising:

linking the eSIM profile to an embedded Universal Integrated Circuit Card (eUICC) identifier (EID) corresponding to the eSIM-capable device using a GSMA (Global System for Mobile Communications Association)-defined RSP (Remote SIM Provisioning) ES2+ Download Order Application Programming Interface (API).

6. The method of claim 1, wherein the communication is configured as an acquire configuration Application Programming Interface (API) configured for linking an eSIM profile to an embedded Universal Integrated Circuit Card (eUICC) identifier (EID) corresponding to an eUICC of the eSIM-capable device.

7. The method of claim 1, wherein the eSIM-capable device automatically initiates the eSIM subscription activation data flow by invoking a manage subscription Application Programming Interface (API) that, responsive to determining that the eSIM subscription is pending, releases the eSIM subscription for downloading subscription activation data to the eSIM-capable device from a Subscription Manager Data Preparation (SMDP) server.

8. The method of claim 1, wherein the pending eSIM subscription is pending while assigned to an embedded Universal Integrated Circuit Card (eUICC) identifier (EID) corresponding to an eUICC of the eSIM-capable device prior to activation by the eSIM-capable device.

9. A device, comprising:

an embedded universal integrated circuit card (eUICC), wherein the eUICC is configured to initiate operations including:

conveying an inquiry to a wireless service provider (WSP) system inquiring whether an embedded subscriber identity module (eSIM) subscription is pending for the device, wherein the conveying is automatically initiated without human intervention in response to powering up the device;

receiving a communication from the WSP system indicating whether the eSIM subscription is pending; and automatically initiating without human intervention an eSIM subscription activation data flow from the WSP system in response to determining that the eSIM subscription is pending.

10. The device of claim 9, wherein the eSIM subscription is configured to include an eSIM profile.

11. The device of claim 10, wherein the WSP system comprises a Subscription Manager Data Preparation (SMDP) server and the eSIM profile is created using the SMDP server.

12. The device of claim 10, wherein the eSIM profile is linked to an eUICC identifier (EID) corresponding to the device.

13. The device of claim 9, wherein the communication is configured as an acquire configuration Application Programming Interface (API) used in linking an eSIM profile to an eUICC identifier (EID) corresponding to the eUICC of the device.

14. The device of claim 9, wherein the device is configured to automatically initiate the eSIM subscription activation data flow by invoking a manage subscription Application Programming Interface (API) that, responsive to determining that the eSIM subscription is pending, releases the eSIM subscription for downloading subscription activation data to the device from a Subscription Manager Data Preparation (SMDP) server.

15. A system, comprising:

one or more processors communicatively configured to initiate operations including:

creating a pending embedded subscriber identity module (eSIM) subscription for an eSIM-capable device;

conveying a pending eSIM subscription message to the eSIM-capable device in response to receiving a communication from the eSIM-capable device indicating an initial powering up of the eSIM-capable device;

automatically generating without human intervention eSIM activation data based on the pending eSIM subscription for the eSIM-capable device; and conveying the eSIM activation data to the eSIM-capable device for downloading to enable the eSIM-capable device to activate the pending eSIM subscription.

16. The system of claim 15, wherein the one or more processors are configured to initiate operations further including configuring the eSIM subscription to include an eSIM profile, and wherein the eSIM activation data includes the eSIM profile.

17. The system of claim 16, wherein the one or more processors are configured to initiate operations further including creating the eSIM profile using a Subscription Manager Data Preparation (SMDP) server.

18. The system of claim 16, wherein the one or more processors are configured to initiate operations further including linking the eSIM profile to an embedded Universal Integrated Circuit Card (eUICC) identifier (EID) corresponding to an eUICC of the eSIM-capable device.

19. The system of claim 18, wherein linking the eSIM profile to the EID corresponding to the eSIM-capable device is performed using a GSMA (Global System for Mobile Communications Association)-defined RSP (Remote SIM Provisioning ES2+ Download Order Application Programming Interface (API).

20. The system of claim 15, wherein the pending eSIM subscription is created in response to conveyance of the eSIM-capable device to a user at a point-of-sale (POS).

* * * * *